(12) United States Patent
Bongard et al.

(10) Patent No.: US 8,454,465 B2
(45) Date of Patent: Jun. 4, 2013

(54) TOOTHED CHAIN WITH OPTIMIZED CHAIN JOINT AND ENLARGED EXTERNAL FLANK ANGLE

(75) Inventors: Andreas Bongard, Paehl (DE); Volker Hirschmann, Furstenfeldbruck (DE); Lutz Welke, Ingolstadt (DE)

(73) Assignee: Iwis Motorsysteme GmbH & Co. KG, Munich (DE)

( * ) Notice: Subject to any disclaimer, the term of this patent is extended or adjusted under 35 U.S.C. 154(b) by 581 days.

(21) Appl. No.: 12/279,384

(22) PCT Filed: Oct. 31, 2006

(86) PCT No.: PCT/EP2006/010474
§ 371 (c)(1),
(2), (4) Date: May 8, 2009

(87) PCT Pub. No.: WO2007/093202
PCT Pub. Date: Aug. 23, 2007

(65) Prior Publication Data
US 2010/0004083 A1      Jan. 7, 2010

(30) Foreign Application Priority Data

Feb. 15, 2006   (DE) .................. 20 2006 002 416 U

(51) Int. Cl.
*F16G 13/04*    (2006.01)
(52) U.S. Cl.
USPC ........................................ 474/212; 474/202
(58) Field of Classification Search
USPC .............. 474/214, 213, 212, 209, 206, 202, 474/157, 156, 155, 152, 148
See application file for complete search history.

(56) References Cited

U.S. PATENT DOCUMENTS

| | | | | |
|---|---|---|---|---|
| 1,678,457 A | * | 7/1928 | Belcher | 474/157 |
| 4,194,415 A | * | 3/1980 | Kennington et al. | 475/167 |

(Continued)

FOREIGN PATENT DOCUMENTS

| | | |
|---|---|---|
| DE | 20111494 U1 | 1/2003 |
| DE | 20213990 U1 | 11/2003 |

(Continued)

OTHER PUBLICATIONS

Reber, R. "Development of a New Drive Chain for Continuously Variable Transmissions," SAE Technical Paper 891341, 1989.

(Continued)

*Primary Examiner* — Sang Kim
*Assistant Examiner* — Juan Campos, Jr.
(74) *Attorney, Agent, or Firm* — Leydig, Voit & Mayer, Ltd.

(57) ABSTRACT

The invention is related to a toothed chain with alternating inner and outer chain links each joined by means of a chain joint, wherein the inner chain links comprise at least one inner plate and at least two joint bushes running perpendicularly through the same, the outer chain links comprise at least two outer plates and at least two joint pins running perpendicularly through the same, and to form a chain joint, one joint pin of the outer chain link each extends through a joint bush of the inner chain link, and at least one inner plate of the inner chain link and/or at least one outer plate of the outer chain link is embodied as a toothed plate with each two teeth defined by an outer flank and an inner flank each. To provide a toothed chain having an improved service life and which can lead to a more advantageous embodiment of the complete chain drive, it is provided that an external flank angle given for the two external flanks of a toothed plate, is $\alpha \geq 65°$ and $\leq 75°$, and a ratio $V_{Ba}$ between a pitch p of the toothed chain and the outer diameter $d_{Ba}$ of the joint pins is $\leq 2.65$.

18 Claims, 8 Drawing Sheets

U.S. PATENT DOCUMENTS

Figure 1A:
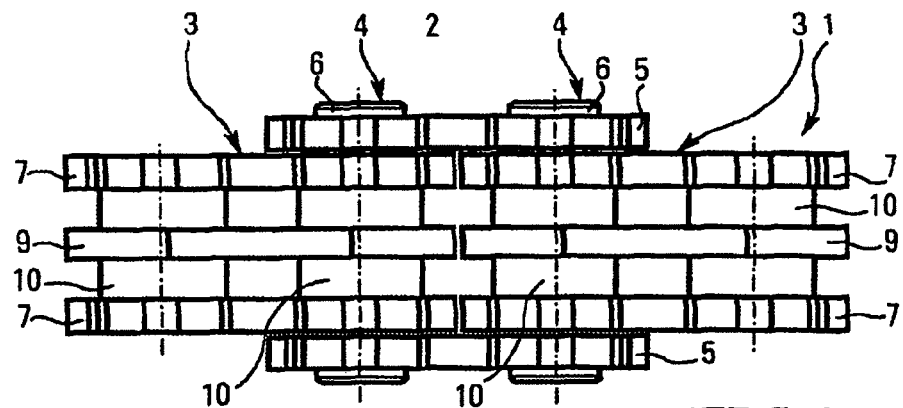

| | | | |
|---|---|---|---|
| 4,591,353 A | 5/1986 | Reber | |
| 4,759,740 A | 7/1988 | Cradduck | |
| 4,906,224 A | 3/1990 | Reber | |
| 5,427,580 A | 6/1995 | Ledvina et al. | |
| 5,700,217 A * | 12/1997 | Wakabayashi | 474/217 |
| 6,159,122 A * | 12/2000 | Kanehira et al. | 474/212 |
| 7,056,248 B2 * | 6/2006 | Butterfield | 474/212 |
| 7,404,778 B2 * | 7/2008 | Butterfield | 474/212 |
| 7,758,461 B2 * | 7/2010 | Feld et al. | 474/212 |
| 2001/0000781 A1 | 5/2001 | Reber | |
| 2001/0006918 A1 * | 7/2001 | Saitou | 474/212 |
| 2002/0111238 A1 * | 8/2002 | Okabe et al. | 474/213 |
| 2002/0115514 A1 * | 8/2002 | Okabe et al. | 474/212 |
| 2002/0132690 A1 * | 9/2002 | Suzuki et al. | 474/212 |
| 2004/0185979 A1 | 9/2004 | Schulze et al. | |
| 2005/0049097 A1 * | 3/2005 | Butterfield | 474/206 |
| 2005/0049098 A1 * | 3/2005 | Butterfield | 474/212 |
| 2005/0187057 A1 * | 8/2005 | Lou | 474/245 |
| 2007/0072719 A1 * | 3/2007 | Sakamoto | 474/212 |
| 2007/0287563 A1 * | 12/2007 | Butterfield | 474/212 |

FOREIGN PATENT DOCUMENTS

| | | |
|---|---|---|
| EP | 1293704 A2 | 3/2003 |
| EP | 1293704 A3 | 3/2003 |
| EP | 1293704 B1 | 9/2006 |
| GB | 2373833 A | 10/2002 |
| GB | 2373833 B2 | 7/2004 |
| JP | 2001108022 A * | 4/2001 |

OTHER PUBLICATIONS

The American Society of Mechanical Engineers, "American National Standard—Inverted Tooth (Silent) Chains and Sprockets," ANSI B29.2M-1982, 49 pages, issued Mar. 31, 1984.

The American Society of Mechanical Engineers, "American National Standard—Inverted Tooth (Silent) Chains and Sprockets," ASME B29,2M-2007, 45 pages, issued Jun. 25, 2007.

* cited by examiner

TOOTHED CHAIN WITH OPTIMIZED CHAIN JOINT AND ENLARGED EXTERNAL FLANK ANGLE

The present invention relates to a toothed chain with alternating inner and outer chain links each joined by means of a chain joint. In one embodiment of the invention, the inner chain links comprise at least one inner plate and at least two joint bushes running perpendicularly through the same, and the outer chain links comprise at least two outer plates and at least two joint pins running perpendicularly through the same, wherein, to form a chain joint, one joint pin of the outer chain link each extends through a joint bush of the inner chain link.

Such a toothed chain is known, for example, from GB 2373833 B. The inner chain links in this chain consist of two inner toothed plates arranged in parallel with respect to each other which are fixed by means of two joint bushes at a parallel distance with respect to each other. For this, the joint bushes are pressed into the toothed plates. The outer chain links consist of two toothed plates arranged in parallel with respect to each other and of externally situated guide plates. At least the guide plates are connected by means of two joint pins pressed into the same. A joint pin of the outer chain link extends through one bush each of the inner chain link with little clearance. Such toothed chains are prepared with an external flank angle of 60°. This angle is decisive in that the chain resting on the chain wheel is, with its external flanks, in contact with the teeth of the chain wheel. Such toothed chains are in particular employed in timing chain drives of automobile engines. Due to the existing high cost pressure in this field, constant efforts are made to improve the durability of such chains without an increase in cost being involved. Furthermore, toothed chains in this field of employment have already reached their limits as to their load capacities, so that already slightly increased performances of an engine can lead to a complete new design of the complete chain drive. Accordingly, even relatively small improvements of the service life of the toothed chain lead to a considerable advantage.

It is therefore an object of the present invention to provide a toothed chain that has an improved service life and can lead to an advantageous design of the complete chain drive.

According to the invention, this object is achieved with a toothed chain of the type mentioned in the beginning in that an external flank angle predetermined by the two external flanks of a toothed plate is $\alpha \geq 65°$ and $\leq 75°$, and that a ratio $V_{Ba}$ between a pitch p of the toothed chain and the outer diameter $d_{Ba}$ of the joint pins is $\leq 2.65$.

Thanks to this purposeful constructive change, the teeth of the chain wheels can be made to have a more stable design. By this, the toothed chain can also be engaged with chain wheels which have a reduced number of teeth. A reduction down to 18 teeth at the chain wheel is thereby possible. Moreover, this construction does not only lead to a more stable design of the chain wheels, but also to an enlargement of the joint surface at the joint pins and thereby also at the joint bushes. This enlargement is also possible by changing the external flank angle $\alpha$ and thus leads to an improvement of the service life of the toothed chain. With an 8 mm chain, thus the predetermined minimum outer diameter $d_{Ba}$ of the link pin is 3.019 mm.

At this point, it should be noted that, instead of the definition by means of the outside diameter of the joint pin, the definition can also be given by means of the inner diameter of the joint bush.

Preferably, the ratio $V_{Ba}$ is in the range of $\leq 2.65$ and $\geq 2.15$. With an 8 mm chain, the largest selectable outer diameter accordingly is $d_{Bamax} = 3.81$ mm. This guarantees a sufficient remaining thickness of the joint bush on the basis of a suited plate length limited by the pitch.

Due to the geometric conditions, according to a variant, even larger outer diameters $d_{HA}$ of the joint bush can be selected. For this, a ratio $V_{Bi}$ between a pitch p of the toothed chain and the outer diameter $d_{Ha}$ of the joint bush of $\leq 1.85$ can be selected.

For a sufficient remaining wall thickness of the plate, according to a further variant, a ratio $V_{Bi}$ of $\leq 1.85$ and $\geq 1.45$ is provided. The maximally admissible plate length significantly depends on the pitch, which is the reason why the outer diameter $d_{Ha}$ of the joint bush should be as large as possible, but for stability reasons must not exceed a certain amount. According to this demand, e.g. with an 8 mm toothed chain, the largest possible outer diameter is $d_{Ha} = 5.517$ mm, whereas the smallest selectable outer diameter is 4.324 mm.

In a particularly preferred embodiment, it is provided that the external flank angle $\alpha$ is approx. 70°. This external flank angle proved to be particularly favorable with respect to stability considerations. In particular, one can thereby also suitably influence the stability of the chain wheels.

Furthermore, the outer chain link can comprise two guide plates each arranged outside on the joint pins. These guide plates then guide the toothed chain on the chain wheel. The advantage is that no special chain wheel shape is required; however, this variant is somewhat broader.

Another embodiment provides for the inner chain link to comprise at least one guide plate arranged on the joint bushes. It is true that with this variant the chain wheel has to have a suited guide groove; however, this embodiment is narrower as a lateral projection beyond the chain wheel width is not necessary.

The invention furthermore relates to toothed chains the inner chain links of which do not comprise any joint bushes, but where the joint pins are arranged directly in the joint openings of the inner plates. Accordingly, the inner chain links comprise at least one inner plate and two joint bushes running perpendicularly through the same, the outer chain links comprise at least two outer plates and at least two joint pins running perpendicularly through the same, wherein, to form a chain joint, a joint pin of the outer chain link each extends through a joint opening of the inner chain link, and at least one inner plate of the inner chain link and/or one outer plate of the outer chain link is designed as toothed plate with two teeth defined each by one outer flank and one inner flank. According to the invention, it is provided here that an external flank angle predetermined by the two external flanks of a toothed plate is $\alpha \geq 65°$ and $\leq 75°$, and that a ratio $V_{Ba}$ between a pitch p of the toothed chain and the outer diameter $d_{Ba}$ of the joint pins is $\leq 2.2$, preferably $\leq 2.0$.

With an 8 mm chain, the outer diameter $d_{Ba}$ of the joint pin is accordingly at least 3.636 mm, preferably at least 4 mm. By this, a considerable enlargement of the joint surface can be achieved. Moreover, the larger external flank angle $\alpha$ provides higher stability in the chain drive.

Preferably, the ratio $V_{Ba}$ is $\leq 2.2$ and $\geq 1.5$. In this embodiment, thus a maximum outer diameter of the joint pin of 5.333 mm in a toothed chain with an 8 mm pitch is admissible for plate stability reasons.

Furthermore, the invention relates to a chain drive with at least two chain wheels and a toothed chain according to one of claims 1 to 9. The chain drive is characterized in that the chain wheels have a pressure angle which essentially corresponds to the external flank angle a of the toothed plates and that at least one chain wheel comprises a number of teeth of $\leq 20$. In cooperation with the novel toothed chain, a chain drive is produced which generates more stable chain wheel teeth at least in one chain wheel, and which leads to a reduction of the number of teeth to at least 20 in at least one other chain wheel. With toothed chains having an outer pressure angle of 60°, the lower limit economically justifiable up to now was approx. 21 teeth.

The invention also relates to a toothed chain set with at least two toothed chains according to one of claims 1 to 7 having different pitches p. For example, toothed chains of identical construction with pitches of 9.525 mm (⅜"), 8 mm and 7 mm are possible. The toothed chain set is characterized in that an outer diameter $d_{Ba}$ of a joint pin of these toothed chains of the toothed chain set is determined as follows:

$$d_{Ba}=0.125 \times p^2-1.347 \times p+C, \text{ wherein}$$

p is the pitch of the respective toothed chain, and
C is a value determined depending on the outer pressure angle α, wherein C corresponds to the 2.1 to 2.25-fold of tan α. The outer diameter of the joint pin is accordingly determined on the basis of the pitch p and the selected external flank angle α. With an 8 mm toothed chain and an external flank angle α of 70°, the diameter $d_{Ba}$ is minimally 2.994 mm and maximally 3.406 mm. The other pitches correspondingly have certain minimum and maximum values for $d_{Ba}$. For the complete chain set, an optimized toothed chain service life results from this, in particular for the applications as timing chain in an internal combustion engine. A respectively optimized size of the joint surface which depends on the outer diameter $d_{Ba}$ and the external flank angle is achieved. Correspondingly, the invention also relates to a toothed chain set with at least two toothed chains according to one of claims 8 or 9 having different pitches p. Here, it is provided according to the invention that an outer diameter $d_{Ba}$ of a joint pin of these toothed chains is determined as follows:

$$d_{Ba}=p-D, \text{ wherein}$$

p is the pitch of the respective toothed chain, and
D is a value determined depending on the outer pressure angle α, wherein D corresponds to the 1.27 to 1.3-fold of tan α. With an 8 mm toothed chain without joint bushes, the maximum outer diameter of the joint pin with an external flank angle of 70° is accordingly 4.511 mm, and the minimum diameter is 4.428 mm. Here, too, the toothed chain set is optimally adapted with respect to its improved durability, where the chain joint consists of joint openings and link pins. It should be noted that the dependency can also be related to the inner diameter of the joint opening and not to the outer diameter of the joint pin. The only important thing is a size by which the joint surface is influenced due to the diameter.

Figure 1B:
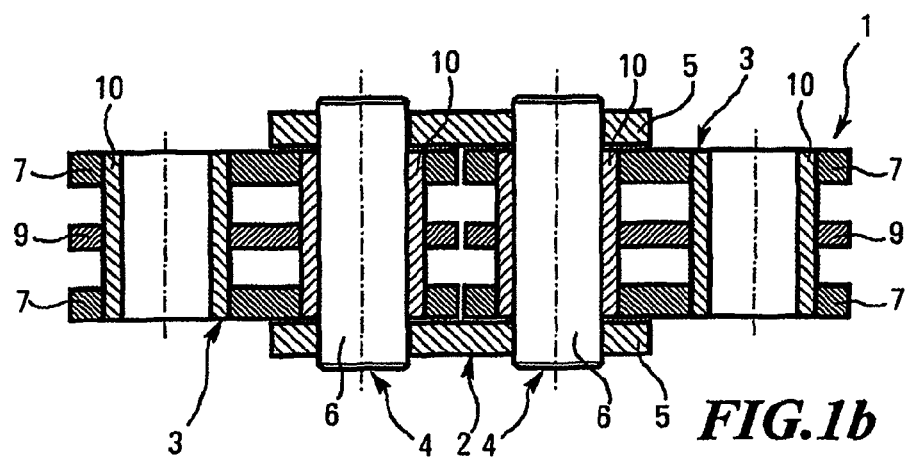
Figure 1C:
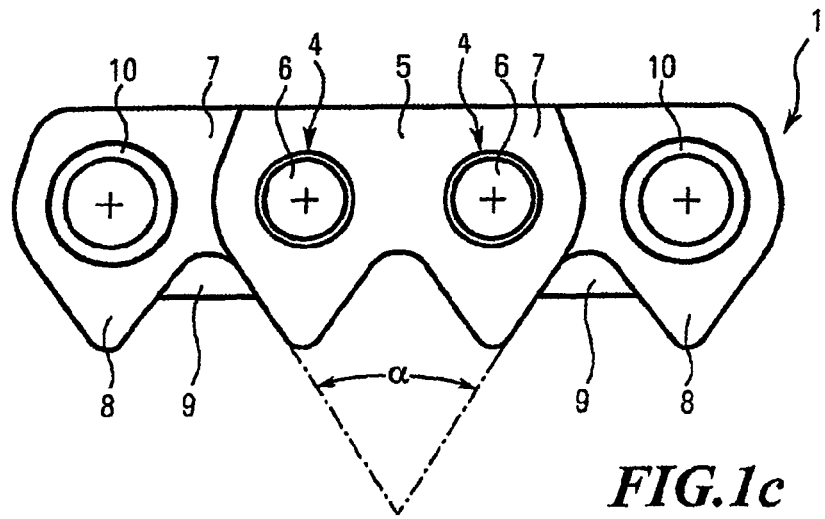
Figure 2:
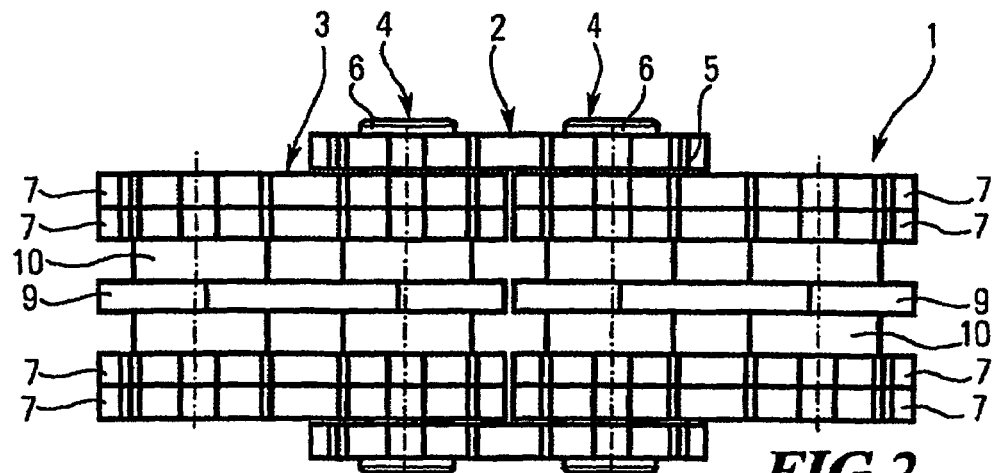
Figure 3:
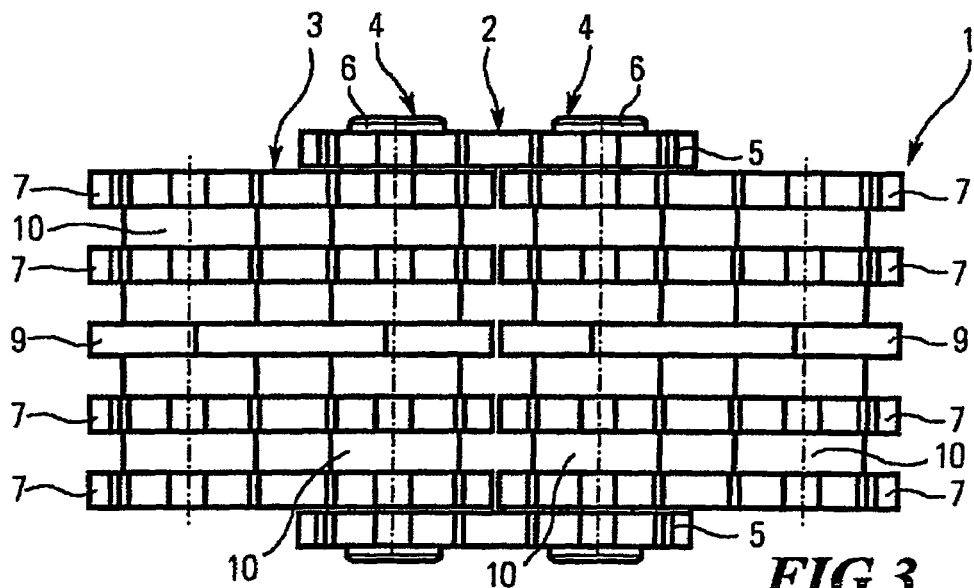
Figure 4:
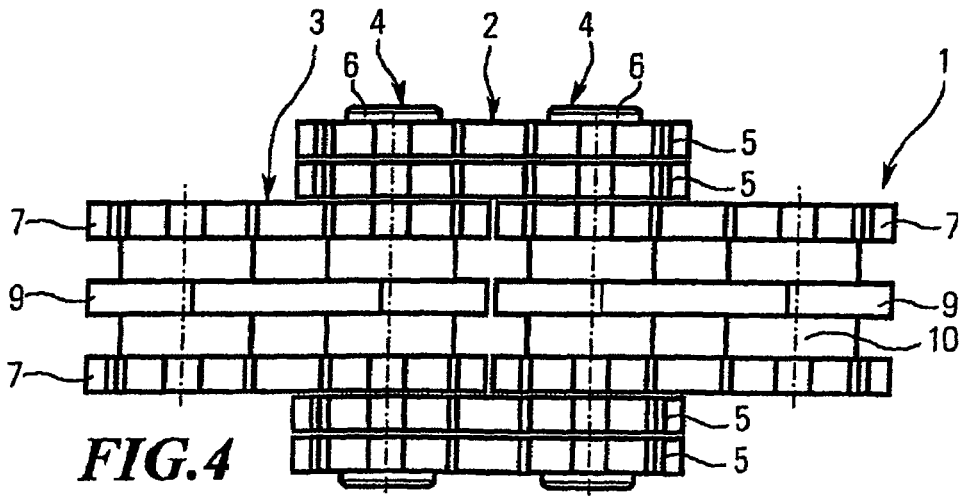
Figure 5:
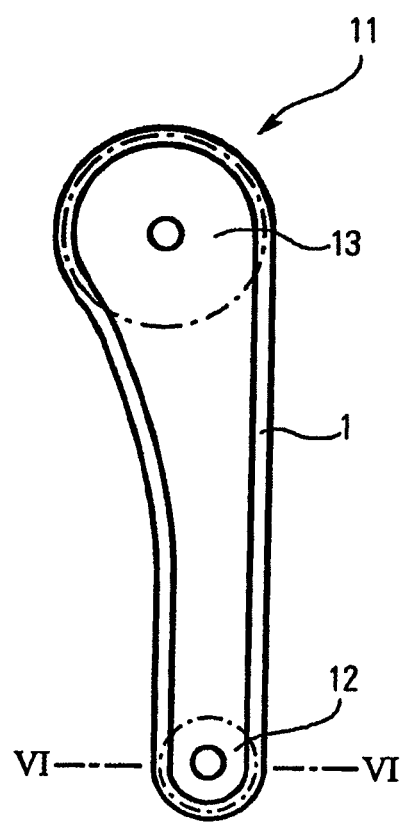
Figure 6:
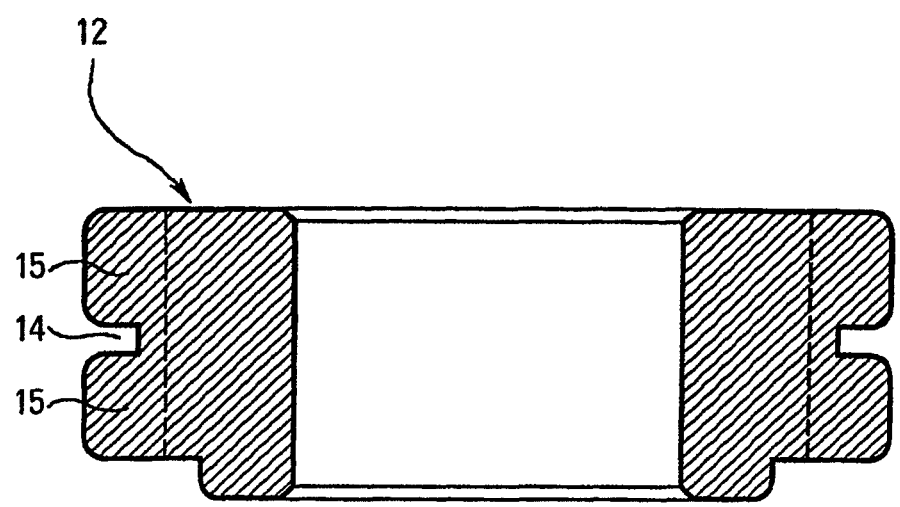
Figure 8:
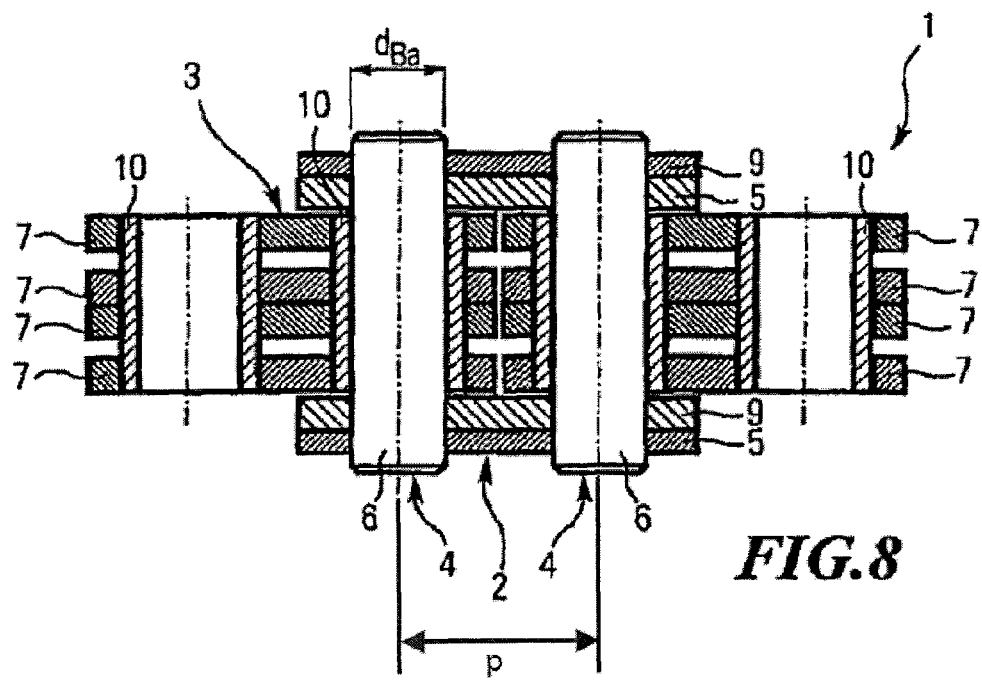
Figure 7:
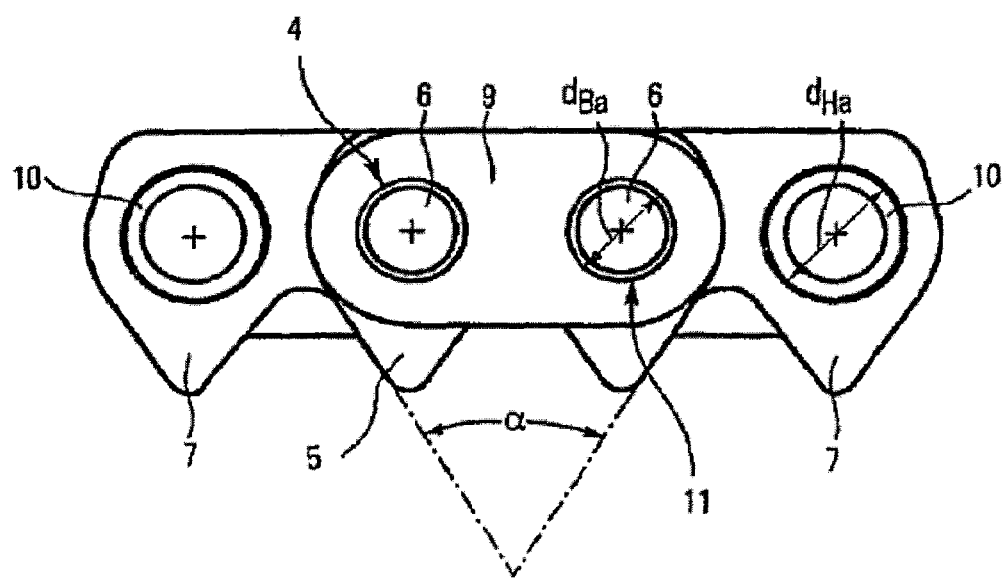
Figure 9:
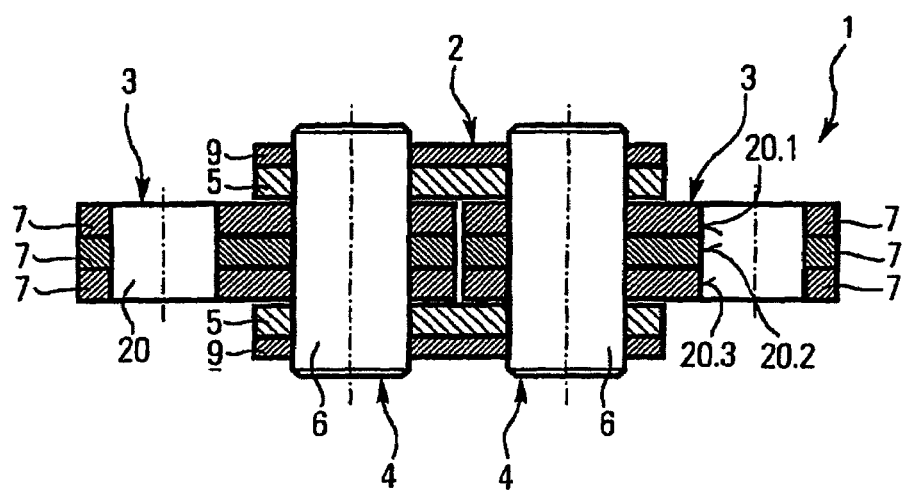
Figure 10:
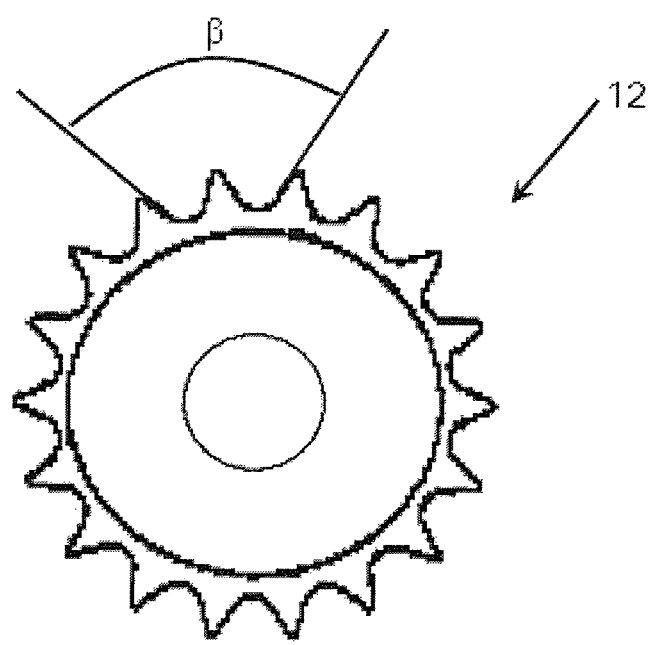
Figure 11A:
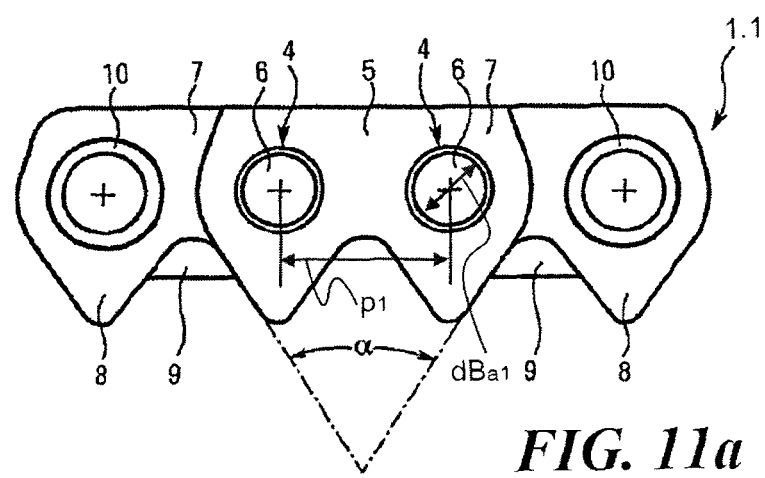
Figure 11B:
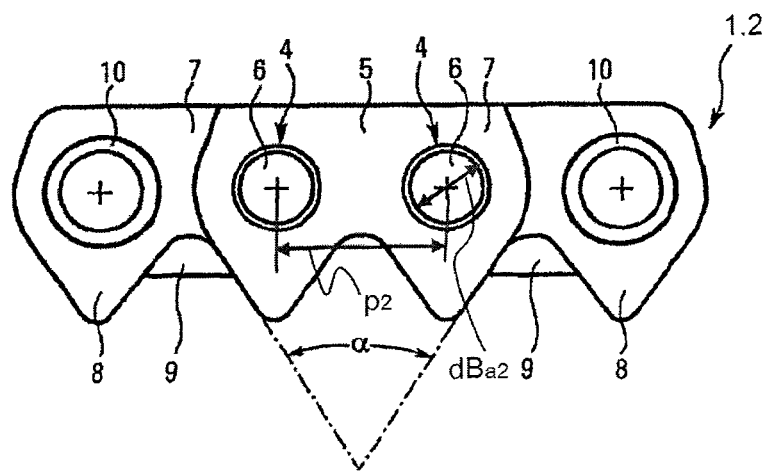

In the following, the invention will be further illustrated with reference to several embodiments. In the drawings:

FIG. 1a shows a plan view of a detail of a first embodiment;
FIG. 1b shows a sectional view of the embodiment which is shown in FIG. 1a,
FIG. 1c shows a side view of the embodiment which is shown in FIG. 1a,
FIG. 2 shows a plan view of a second embodiment of a toothed chain according to the invention,
FIG. 3 shows a plan view of a third embodiment of a toothed chain according to the invention,
FIG. 4 shows a plan view of a fourth embodiment of a toothed chain according to the invention,
FIG. 5 shows a side view of a chain drive according to the invention and a toothed chain according to the invention,
FIG. 6 shows a section through a chain wheel of the chain drive of FIG. 5 along line VI-VI,
FIG. 7 shows a side view of a fourth embodiment of a toothed chain according to the invention,
FIG. 8 shows a sectional view of the toothed chain which is shown in FIG. 7, and
FIG. 9 shows a sectional view of a fifth embodiment of a toothed chain.
FIG. 10 shows a sectional view of a sprocket having a pressure angle β, and
FIGS. 11a and 11b show a side view of a toothed chain set according to the invention.

The toothed chain 1 according to the invention represented in FIG. 1 comprises alternatingly arranged outer chain links 2 and inner chain links 3 which are joined by means of chain joints 4. The outer chain links 2 consist of outer plates 5 respectively arranged outside and extending in parallel to each other and having aligned openings into which each a joint pin 6 is pressed and riveted.

The inner chain links 3 are positioned between the outer plates 5 of the outer chain links 2 and each comprise two toothed plates 7 which are arranged in parallel to each other and to the outer plates 5. The toothed plates 7 are here oriented to be offset with respect to the externally situated outer plates 5. Furthermore, the inner chain links 3 comprise a guide plate 9 as well as two joint bushes 10 each. The guide plate 9 is arranged in the center of the inner chain link 3, while the two toothed plates 7 are arranged outside at the joint bushes 10 and are flush with the front sides of the cylindrical joint bushes 10. The guide plate 9 as well as the two externally situated toothed plates 7 are provided with bush openings and pressed onto the joint bushes 10. Here, the guide plate 9 is also arranged perpendicularly to the joint bushes 10 and in parallel to both toothed plates 7.

Each chain joint 4 is formed by the joint pin 6 of the outer chain link 2 and the cylinder opening of the joint bush 10. Here, the joint surface of the chain joint 4 continually extends over the complete inner face of the cylinder opening.

Each toothed plate 7 of the inner chain link 3 comprises two teeth 8 arranged at one side mirror-symmetrically to a central line (not shown) bisecting the plate. The teeth 8 have a corresponding shape for engagement with a corresponding chain wheel 12, 13. Here, the external flanks of the teeth 8 provided outside at the toothed plates 7 have an external flank angle α of 70° (preferably between 65° and 75°). The engagement of the teeth 8 or the power transmission to the chain wheels 12, 13 here is essentially performed via the external flanks. Furthermore, each toothed plate 7 comprises two bush openings arranged at a predetermined distance to each other, in which in operation a corresponding joint bush 10 each is received.

The outer plates 5 of the outer chain link 2 can be designed similarly as the toothed plates 7 with teeth 8 to engage with a chain wheel 12, 13. In another embodiment, the outer plates 5 or the outer plates of the outer chain link respectively arranged outside can be embodied similar to the guide plates 9 for guiding the toothed chain 1.

The guide plates 9 are, in the embodiment which is shown in FIGS. 1a to 1c, embodied as simple chain plates in a conventional embodiment. Such a standard plate shape has, apart from the bush openings arranged at the front sides in the chain running direction, rounded front sides with a constant distance to the bush openings as well as straight side edges which join the semicircular front sides. In contrast to the toothed plates 7 and the outer plates 5, where the material thickness, i.e. the thickness of the plate, essentially depends on the power transmission requirements, the thickness of the guide plate 9 is clearly smaller and only reaches approx. 62.5% of the thickness of the toothed plates 7 and/or the outer plates 5. With the usual plate thickness of 1.6 mm, the guide plate 9 has a corresponding thickness of approx. 1.0 mm.

As the distance of the toothed plates 7 of the inner chain link 3, and thus also the distance of the externally situated toothed plates 7 to the centrically arranged guide plate 9 is determined by the axial length (in the direction of the joint pin) of the joint bushes 10, the centrically arranged guide plate 9 and the externally situated toothed plates 7 are spaced apart. Here, the distance essentially results from the length of the joint bushes 10 which preferably corresponds to the bush length of a conventional link chain and the thickness of the toothed plates 7 as well as the guide plate 9.

In the embodiment which is shown in FIG. 1, on both sides each an outer plate 5 with teeth 8 is arranged next to a toothed plate 7 of the inner chain link 3. The toothed chain has a pitch p. Usually, 7 mm, 8 mm, and 9.25 mm (3/8") are employed as pitch p in the automobile field (e.g. timing chain at an internal combustion engine). The diameter $d_{Ba}$ (outer diameter) of the joint pin 6 can be optimized with respect to conventional toothed chains due to the changed external flank angle α (here 70°). A ratio $V_{Ba}$ between a pitch p of the toothed chain and the outer diameter $d_{Ba}$ of the joint pin here is ≦2.65. This means that with a pitch of 7 mm, the smallest selectable outer diameter $d_{Ba}$=2.642 mm, with an 8 mm pitch it is 3.019 mm, and with a 9.525 mm pitch it is 3.594 mm. For stability reasons, a preferred upper limit for the outer diameter $d_{Ba}$ is also given. For this, the ratio $V_{Ba}$ minimally is 2.15.

The joint bushes 10 have an outer diameter $d_{Ha}$. With a pitch of 9.525 mm, it is e.g. 6.35 mm, and a pitch of 8 mm results in 5 mm for it. The ratio $V_{Bi}$ between the pitch and the outer diameter $d_{Ha}$ of the joint bushes 10 is between 1.85 and 1.45.

FIG. 5 shows a schematic side view of a chain drive 11. In this chain drive 11, a toothed chain 1 according to the invention is placed around a drive chain wheel 12 and a driven chain wheel 13 corresponding to the usual arrangement for a timing chain drive of an internal combustion engine. For its operation in the internal combustion engine, the schematically represented chain drive 11 in a usual embodiment moreover requires a sliding rail and a chain tensioner which are not shown in FIG. 5. To receive the guide plate 9 arranged on the inner chain link, the drive chain wheel 12 as well as the driven chain wheel 13 comprise a surrounding groove 14 which divides the teeth 15 of the chain wheel 12, 13.

FIG. 6 shows a section through the drive chain wheel 12 with a groove 14 essentially centrically dividing the teeth 15, in which a guide plate 9 arranged centrically between the toothed plates 7 of the inner chain link 3 is received corresponding to the toothed chain 1 of FIGS. 1a to 1c.

The chain wheel 12 has a pressure angle of 70° which essentially corresponds to the outer pressure angle α of the toothed plates 5 and 7. The toothed plates namely rest with their external flanks on the teeth of the chain wheel. Due to this selected flank angle, the number of teeth of the drive chain wheel 12 is reduced to below 20, here 18.

The embodiment represented in FIGS. 1a to 1c can be employed within a toothed chain set as shown in FIGS. 11a and 11b. With an identical construction, such toothed chains are accordingly designed with a pitch of 7 mm, 8 mm, and 9.525 mm (3/8"). An optimization of the toothed chain set is achieved in that the outer diameter $d_{Ba1,2}$ of the joint pin 6 of these toothed chains 1.1 and 1.2 is determined as follows:

$$d_{Ba1,2}=0.125*p_{1,2}^2-1.347*p_{1,2}+C, \text{ wherein}$$

$p_{1,2}$ is the pitch of the respective first or second toothed chain, and

C is a value determined depending on the outer pressure angle .alpha., wherein C corresponds to the 2.1 to 2.25 times of tan α. A set with an outer pressure angle of 70°, pitches $p_1$ of 7 mm, $p_2$ of 8 mm, and $p_3$ of 9.525 mm, and the correspondingly associated outer diameters $d_{Ba1}$ of 2.67 mm, $d_{Ba2}$ of 3.315 mm and $d_{Ba3}$ of 4.41 mm, satisfies this condition.

In the operation of the chain drive 11, the toothed chain 1 is driven by the drive chain wheel 12. In the process, the toothed plates 7 with their teeth 8 as well as the teeth of the outer plates 5 engage with the chain wheel teeth 15 of the drive chain wheel 12. The guidance of the toothed chain is ensured by the guide plates 9 which engages with the groove 14 and prevents the toothed chain 1 from laterally coming out from the drive chain wheel 12 and the driven chain wheel 13. The power to be transmitted by the drive chain wheel 12 to the toothed chain 1 is transmitted by the toothed chain 1 at the driven chain wheel 13 and there it is transmitted to a coupled module (e.g. a cam wheel). Improved service life of the toothed chain compared to conventional toothed chains results from the changed external flank angle α and the optimization of the joint surface.

In FIG. 2, a second embodiment of the toothed chain 1 is represented. In this embodiment, at the front sides of the joint bushes 10, two toothed plates 7 each are arranged next to each other as a package. Here, the distance between the externally situated toothed plates 7 and the guide plate 9 is unchanged with respect to the embodiment of FIG. 1. However, an embodiment of the toothed chain 1 is possible in which the axial length of the joint bush 10 remains unchanged and instead the distance between the guide plate 9 and the toothed plates 7 is reduced by the thickness of the additionally pressed on toothed plate 7.

FIG. 3 shows a third embodiment of the toothed chain 1 in which another toothed plate 7 is arranged on the joint bush 10 of the inner chain link 3 also on both sides of the guide plate 9. In this embodiment, a distance is provided between the guide plate 9 and the adjacent toothed plate 7 as well as between the toothed plates 7 arranged each on one side of the guide plate 9. Here, the distances between the toothed plates 7 and with respect to the guide plate 9 can be the same or different. Moreover, an embodiment of a toothed chain 1 according to the invention with a plate package of adjacent guide plates 9 and toothed plates 7 is conceivable.

The fourth embodiment of the toothed chain 1 shown in FIG. 4 shows an outer chain link 2 where on each end of the joint pins 6, two outer plates are pressed on as a package next to each other. Here, the outer plates arranged next to each other as a package can be both embodied as toothed plates, but also as a toothed plate and an externally situated guide plate. It is true that the outer plates represented in FIG. 4 are shown with the same thickness with respect to the toothed plates 7 of the inner chain link 3, however, the outer plates 5 can in this embodiment also be thinner and/or be spaced from each other by a predetermined dimension.

In the following, with reference to FIGS. 7 and 8, a fifth embodiment of the toothed chain 1 according to the invention is described more in detail. Only the essentially differences are discussed, so that for elements of identical construction and effects, the same reference numerals are used and reference is made to the above description. This toothed chain 1 is mainly different in that it comprises two guide plates 9 which are each pressed onto the end sections of the joint pins 6 externally. Each outer chain link 2 accordingly consists of two joint pins 6, two outer toothed plates 5 and two guide plates 9.

The corresponding inner chain link 3 consists of two joint bushes 10 and four toothed plates 7 pressed onto the same. Two of the toothed plates 7 are arranged as plate package in the center of the joint bushes 10, while the other two toothed plates 7 are each pressed on at the ends of the joint bushes 10. The ratios and the assembly demands are identical to the preceding embodiments.

In the following, a sixth embodiment is described more in detail with reference to FIG. 9. This embodiment mainly differs from the preceding embodiments in that no joint bushes are used. The larger joint pins 6 are directly received in the joint openings 20 of the toothed plates 7. In the present case, the inner chain link 3 consists of three toothed plates 7 arranged one next to the other to form a package, with an outer pressure angle α of 70° (preferably between 65° and 75°).

An outer chain link 2 consists of two joint pins 6 arranged in parallel to each other, two toothed plates 5 each laterally arranged externally next to the inner plates 7, and the guide plates 9 pressed onto the end sections of the joint pins 6. The joint opening formed by the three inner toothed plates 7 has little clearance with respect to the joint pins 6 inserted into them, so that a chain joint 4 is formed.

The outer diameter $d_{Ba}$ of the joint pins 6 is selected such that a ratio $V_{Ba}$ between the pitch p and the outer diameter $d_{Ba}$ is $\leq 2.2$, preferably $\leq 2.0$. With an 8 mm pitch, the diameter $d_{Ba}$ is in one embodiment 4.44 mm, and with a pitch of 9.525 mm (⅜"), $d_{Ba}$=6 mm. With both pitches p, thus the condition is satisfied. A toothed chain set of toothed chains with identical construction and different pitches p designed in such a way thus also satisfies the following demand:

$$d_{Ba} = p - D, \text{ wherein}$$

p is the pitch of the toothed chain, and

D is a value determined depending on the outer pressure angle α, wherein C corresponds to the 1.27 to 1.3-fold of tan α. With a pitch of 8 mm, accordingly the maximally admissible outer diameter $d_{Ba}$ of a joint pin is 4.511 mm, and the minimally desired one is 4.428 mm. With a pitch of 9.525 mm (⅜"), the maximum value of $d_{Ba}$ is, for stability reasons, 6.036 mm, and the minimum value is 5.953 mm. These values all relate to an external flank angle α of 70°.

By these demands, a joint surface as large as possible is formed, and in addition, a more stable chain drive by reinforced chain wheel teeth is formed. Here, too, the dependency of the inner diameter of the joint opening 20 could be determined as these define the chain joint together with the diameter $d_{Ba}$.

The invention claimed is:

1. Toothed chain with alternating inner and outer chain links, the inner chain links comprising at least one inner plate and at least two joint bushes running perpendicularly through the same, the outer chain links comprising at least two outer plates and at least two joint pins running perpendicularly through the same, the alternating inner and outer chain links being joined by a chain joint defined by one of the at least two joint pins of the outer chain link extending through a corresponding one of the at least two joint bushes of the inner chain link, wherein at least one inner plate of the inner chain link and/or at least one outer plate of the outer chain link is embodied as a toothed plate with each two teeth defined by an outer flank, and wherein an external flank angle given for two external flanks of the toothed plate, is $\alpha \geq 65°$ and $\leq 75°$, and a ratio $V_{Ba}$ between a pitch p of the toothed chain and an outer diameter $d_{Ba}$ of the joint pins is $\leq 2.65$ and $\geq 2.15$.

2. Toothed chain according to claim 1, wherein a ratio $V_{Bi}$ between a pitch p of the toothed chain and an outer diameter $d_{Ha}$ of the joint bush is $\leq 1.85$.

3. Toothed chain according to claim 2, wherein the ratio $V_{Bi}$ is $\leq 1.85$ and $\geq 1.45$.

4. Toothed chain according to claim 1, wherein the external flank angle α is approx. 70°.

5. Toothed chain according to claim 1, wherein the outer chain link comprises two guide plates each arranged externally on the joint pin.

6. Toothed chain according to claim 1, wherein the inner chain link comprises at least one guide plate arranged on the joint bushes.

7. The toothed chain of claim 1, wherein the pitch p=8 mm, the external flank angle α=70°, the outer diameter $d_{Ba}$ of the joint pins is $\geq 3.13$ mm and $\leq 3.16$ mm such that the ratio $V_{Ba}$ is $\geq 2.53$ and $\leq 2.56$, and wherein the outer diameter $d_{Ha}$ of the joint bush is $\geq 4.98$ mm and $\leq 5.00$ mm, such that the ratio $V_{Bi}$ is $\geq 1.60$ and $\leq 1.61$.

8. The toothed chain of claim 1, wherein the external flank angle α=70°.

9. The toothed chain of claim 1, wherein the pitch p=7 mm.

10. The toothed chain of claim 1, wherein the pitch p=8 mm.

11. The toothed chain of claim 1, wherein the pitch p=9.525 mm.

12. Toothed chain with alternating inner and outer chain links, wherein the inner chain links comprise at least one inner plate and two joint openings running perpendicularly through and being formed by the same, the outer chain links comprise at least two outer plates and at least two joint pins running perpendicularly through the same, the alternating inner and outer chain links being joined by a chain joint defined by one of the at least two joint pins of the outer chain link extending through a corresponding one of the at least two joint openings of the at least one inner plate of the inner chain link, wherein at least one inner plate of the inner chain link and/or an outer plate of the outer chain link is embodied as a toothed plate with each two teeth defined by an outer flank, and an external flank angle given for two external flanks of the toothed plate is $\alpha \geq 65°$ and $\leq 75°$, and wherein a ratio $V_{Ba}$ between a pitch p of the toothed chain and an outer diameter $(d_{Ba})$ of the joint pins is $\leq 2.0$.

13. Toothed chain according to claim 12, wherein the ratio $V_{Ba}$ is $\leq 2.0$ and $\geq 1.5$.

14. The toothed chain of claim 12, wherein the external flank angle α=70°.

15. The toothed chain of claim 12, wherein the pitch p=7 mm.

16. The toothed chain of claim 12, wherein the pitch p=8 mm.

17. The toothed chain of claim 12, wherein the pitch p=9.525 mm.

18. Chain drive with at least two chain wheels and the toothed chain according to claim 1, wherein the chain wheels comprise a pressure angle β which corresponds to the pressure angle α of the toothed plates of the toothed chain and at least one chain wheel has a number of teeth of $\leq 20$.

* * * * *